July 27, 1937. T. BROWN ET AL 2,087,882
WHEEL
Filed Dec. 26, 1934
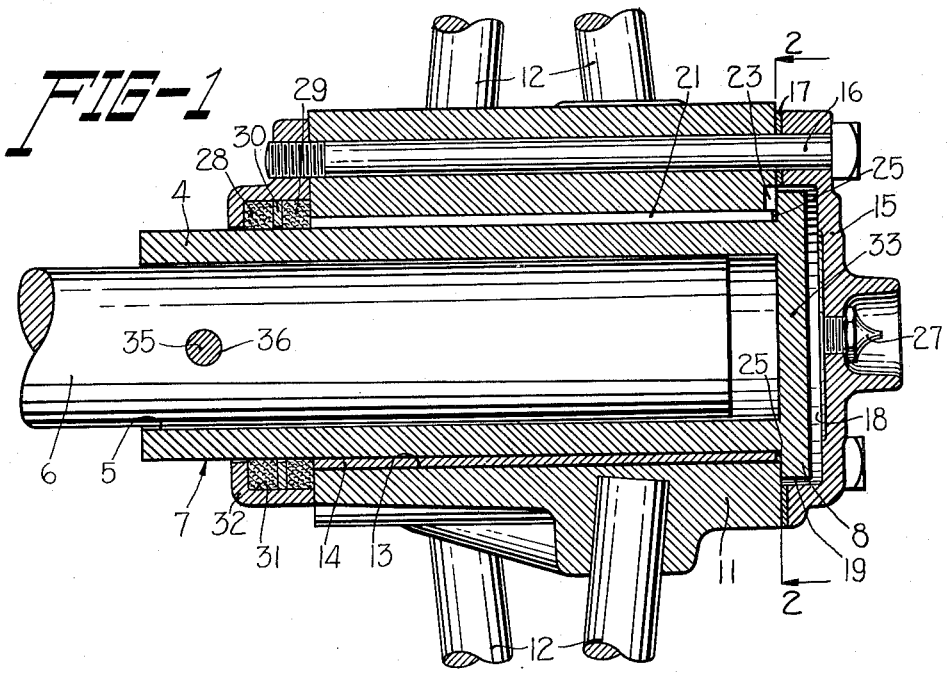
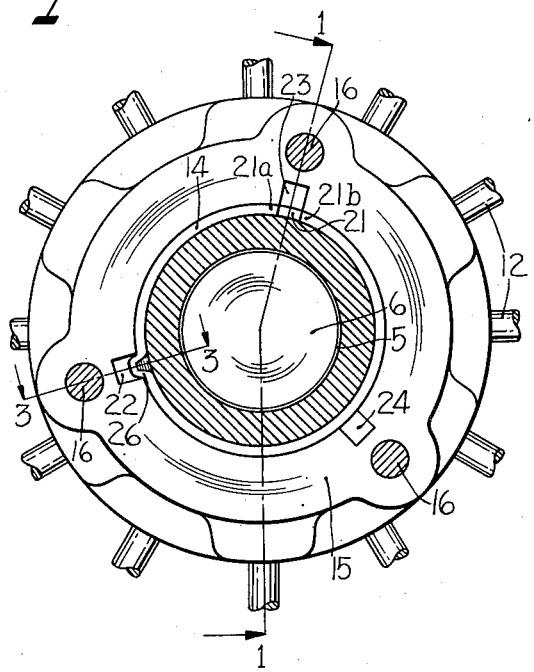
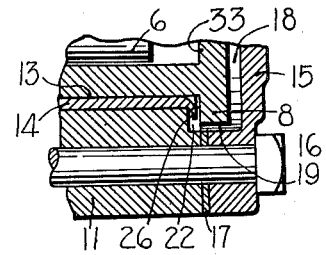
INVENTORS.
Theophilus Brown
Linwood A. Murray
BY Brown, Jackson, Boettcher & Dienner
ATTORNEYS.

Patented July 27, 1937

2,087,882

UNITED STATES PATENT OFFICE 2,087,882

WHEEL

Theophilus Brown and Linwood A. Murray, Moline, Ill., assignors to Deere & Company, Moline, Ill., a corporation of Illinois Application December 26, 1934, Serial No. 759,152

7 Claims. (Cl. 301—1)

The present invention relates to wheels adapted to be used on plows and other farming implements and has more particularly to do with the hub and bearing assemblies therefor.

It is customary in the farming implement manufacturing industry to ship plows and other large or heavy implements from the factory in what is commonly termed "knocked down" form to be assembled by the purchaser at a distant point of delivery, and it is, of course, desirable that the purchaser be able to assemble the implement with a minimum amount of labor and with no danger that any of the parts of the implement be arranged in improper relation to each other. Usually in cases where an implement is shipped in such "knocked down" condition the wheel or wheels of the implement are not connected to or mounted on the axle or axles thereof, and this being so it is a very essential feature from a manufacturing standpoint that the wheel or wheels of the implement can be quickly and easily applied to the axle by the purchaser with all the parts of the wheel assembly, such as the hub, bearings, etc. in their proper relation one to the other.

With the above in view it is the principal object of the present invention to provide a wheel having its hub and bearing assembly so designed that it can be completely assembled at the factory and can be mounted on the wheel axle by the purchaser at a distant point without taking apart the assembly to make such connection, thus assuring that the hub of the wheel will not be placed improperly on its bearing.

Another object of the invention is the provision of improved means for lubricating the bearings of the assembly without disassembling the structure or disconnecting it from its supporting axle.

A further object of the invention is the provision of an improved hub and bearing assembly for wheels whereby the lubricant supplied for lubricating the bearings acts as cushioning means in the lateral movement of the hub and in which such lateral movement of the hub forces lubricant to the bearing surfaces.

Other objects and advantageous features will be apparent from the following description of the preferred embodiment of the invention as illustrated in the accompanying drawing, in which:

Figure 1 is a longitudinal cross sectional view through the improved wheel hub and bearing assembly taken on the plane of the line 1—1 of Figure 2, a portion of the axle to which the assembly is secured being shown in elevation;

Figure 2 is a vertical cross sectional view taken on the plane of the line 2—2 of Figure 1 and illustrating the lubricant receiving recesses formed in the outer end of the hub through which lubricant passes from the lubricant holding receptacle to the bearings; and Figure 3 is a fragmentary longitudinal cross sectional view taken on the plane of the line 3—3 of Figure 2, and illustrating the means for securing one of the bearing sleeves of the assembly to the hub to hold said sleeve against turning in the hub.

The improved wheel hub and bearing assembly comprises a suitable bearing member in the form of a cylindrical sleeve 4 having an internal boring 5 adapted to receive the axle 6 of a plow or other implement upon which the wheel is to be used. The sleeve 4 is preferably, although not necessarily, in the form of a casting having its outer bearing surface 7 chilled to provide a better wearing surface, but it is to be understood that chilling of such outer surface is not necessary in order to come within the scope of the present invention. At or adjacent its outer end, the right hand end as viewed in Figure 1, the sleeve 4 is provided with a circumferential flange 8 preferably formed integral with said sleeve for a purpose to be presently described. In this connection, while the drawing illustrates the flange 8 as being disposed on the extreme outer end of the sleeve, such flange may be disposed at other points on the sleeve without departing from the spirit of the present invention.

The hub of the wheel is indicated by the numeral 11, and as shown it is provided with radially extending spokes 12 which are secured to the hub in any desired manner. In this connection, however, it is to be understood that the wheel may be of the disc type as well as of the spoke type as the type of wheel in this respect has nothing to do with the invention. The hub of the wheel of our improved assembly is provided with an internal boring 13 in which is fitted a removable steel bearing sleeve 14. By using this steel sleeve 14 a wearing surface is provided between the hub proper and the sleeve 4 that can be easily renewed when necessary by replacing the sleeve with a new one.

The hub 11 with its sleeve insert 14 is journaled upon the sleeve 4, the outer end of the hub bearing against the inner face of the circumferential flange 8, and the hub is held in position against laterally inward movement relative to the sleeve 4 by means of a cap plate 15 which fits over the flange 8 and is bolted to the hub 11 by means of a plurality of bolts 16, in the illustrated construction three of such bolts being used. A gasket 17 is provided between the cap plate 15 and the hub 11 to provide an oil-tight seal between these parts. As shown in Figure 1, the cap plate 15 is formed with a recess 18 that is somewhat deeper than the width of the circumferential flange 8 of the sleeve 4 to provide for clearance purposes, and in addition to provide a reservoir for grease or other lubricant. As also shown in Figure 1, the diameter of this reservoir or recess 18 is also made slightly larger than the diameter of the flange 8 to provide a space or opening around the outer side of the flange to permit the lubricant to flow around said flange and work its way in between the inner surface of the steel sleeve 14 and the outer surface of the sleeve 4, as will be readily understood. In order to facilitate the flow of the lubricant between these two surfaces of the sleeves 4 and 14, a slot 21 is provided in the sleeve 14 which extends longitudinally the entire length thereof as shown in Figure 1. In order to provide this slot, the sleeve 14 is preferably formed by bending a piece of plate steel into cylindrical formation with the ends 21a and 21b thereof spaced a relatively short distance apart, say, for example, one-eighth of an inch or thereabout. To further facilitate the flow of the grease or other lubricant between these two bearing surfaces the outer end of the hub 11 is provided with three radially extending depressions or cut-out portions 22, 23 and 24 which form passageways leading from the reservoir 18 to such bearing surfaces. In addition, the steel sleeve 14 is made somewhat shorter in length than the hub 11 so that the outer end of the sleeve when in position on the hub falls short of the outer end of the hub 11, thereby providing a circumferential groove or recess 25 around the hub as shown in Figure 1, with which groove the depressions 22, 23 and 24 communicate. While three radially extending depressions or cut-out portions are illustrated, it is to be understood that the invention is not limited to any certain number of such cut-out portions, as any number sufficient to provide a proper amount of lubricant to the bearing surfaces may be used.

In assembling the steel sleeve 14 in the hub 11 special care is taken to register the end of the longitudinally extending slot 21 in the sleeve 14 with one of the radial depressions 22, 23 or 24, to thereby insure that a sufficient amount of lubricant will be supplied to the slot 21 and through it to the bearing surfaces between the sleeves 4 and 14. Also, in order to hold the sleeve 14 against turning relatively to the hub 11, the end of the sleeve is deformed or upset into one of the other of the recesses 22, 23 or 24 as shown at 26 in Figures 2 and 3. This deforming or upsetting of the end of the sleeve may be performed by the use of a cold chisel or other suitable instrument. The grease or other lubricant is inserted into the reservoir 18 through a suitable lubricant fitting 27 provided in the center of the cap plate 15 as shown or at any other appropriate point.

In order to prevent the escape of lubricant at the inner or left hand end of the hub as viewed in Figure 1, a packing assembly in the form of two felt washers 28 and 29 separated by a steel ring 30 is provided, these several parts being disposed in a suitable recess 31 provided in a cap member or plate 32 clamped in position on the hub 11 by means of the bolts 16 before referred to. The escape of lubricant from the reservoir 18 into the space between the sleeve 4 and the outer or right hand end of the axle 6 is prevented by the closure member 33 formed integral with the sleeve 4 at the outer or right hand end thereof as shown in Figure 1.

It is to be noted that the wheel hub 11 can move longitudinally with respect to the sleeve 4 a distance equal to the difference between the depth of the recess or reservoir 18 and the width of the circumferential flange 8 of the sleeve 4, but as the space between the flange 8 and the inner wall of the cap plate 15 is normally packed with grease such movement is limited by the grease in the recess and any tendency for the bearing sleeve 14 of the hub to move longitudinally along the sleeve 4 as the wheel is in operation will place the grease in the recess under pressure and force the grease from the reservoir through the depressions 22, 23 and 24, slot 21 and in between the bearing surfaces of the sleeves 4 and 14.

As shown, the sleeve 4 is made long enough so that it extends inwardly or toward the left beyond the cap plate 32, and a pair of aligned holes are provided in this extended portion of the sleeve for receiving a locking pin or bolt 35, a hole 36 being provided in the axle 6 to likewise receive this pin to thereby lock the wheel hub and bearing assembly upon the axle. In view of the fact that the holes in the sleeve 4 and the axle 6 are so positioned as to be disposed beyond the end of the cap plate 32 at the inner end of the wheel assembly the pin can be placed in position to secure the wheel on the axle without disassembling the wheel hub and bearing assembly to make such connection.

It will be seen from the above description that applicants have produced a novel arrangement of wheel hub and bearing structure, whereby the complete wheel including the bearings can be assembled at the factory and shipped to the purchaser separate and apart from the axle on which the wheel is to be mounted, and that the purchaser can very readily and quickly mount the wheel on the axle without disassembling any of the parts, which is a very advantageous feature from the manufacturing standpoint. Also grease can be supplied at all times to all parts of the wheel bearings easily and quickly without any disassembling of the parts.

We claim:

1. A wheel hub and bearing assembly comprising a sleeve having a circumferential flange at one end, a wheel hub journaled over said sleeve, the outer end of said hub bearing against the inner side of said flange, means for fixing said sleeve to an axle, means closing the outer end of said sleeve, a bearing sleeve secured to said hub, the outer end of said bearing sleeve being spaced from the flange of said first named sleeve to form a circumferential groove around said hub, a plate fixed over the outer end of said hub and enclosing said flange to form a lubricant chamber between the closed end of said first sleeve and said plate, and passageways in the outer end of the hub communicating with said chamber and with said circumferential groove, whereby longitudinal movement of the hub relative to the first named sleeve will compress the lubricant in the chamber and force such lubricant through the passageways and circumferential groove to the bearing surfaces of the sleeves.

2. A wheel hub and bearing assembly comprising a sleeve having a circumferential flange adjacent its outer end, a wheel hub journaled over said sleeve, the outer end of said hub bearing against the inner side of said flange, a second sleeve interposed between said hub and said first named sleeve and having an upset portion adjacent its outer end, a radially extending depression in the outer end of said hub adjacent the inner side of said flange for receiving said upset portion of said second named sleeve to lock the latter against rotation relative to said hub, and a plate fixed to the outer end of said hub and adapted to bear against the outer side of said flange to hold said hub on said first named sleeve and the upset portion of said second sleeve in said depression.

3. A wheel hub and bearing assembly comprising a sleeve having a circumferential flange adjacent its outer end, a closure member for the outer end of said sleeve, a wheel hub journaled over said sleeve, the outer end of said hub bearing against the inner side of said flange, a second sleeve interposed between said first sleeve and said hub and having a longitudinal lubricant receiving groove, there being a groove formed in the hub communicating with the longitudinal groove in said second sleeve, means for securing said second sleeve to said hub so as to rotate therewith with said grooves in communicating alignment, and a plate fixed to the outer end of said hub and surrounding the outer side of said flange and closure member to provide a lubricant receptacle, communicating through said hub groove with said longitudinal groove.

4. A wheel hub and bearing assembly comprising a sleeve having a circumferential flange at one end, a wheel hub journaled over said sleeve, the outer end of said hub bearing against the inner side of said flange, the inner end of said sleeve projecting beyond the inner end of said hub, means carried by the inner end of said sleeve beyond the inner end of the hub for fixing the sleeve to an axle, a closure member for the outer end of said flange, a plate fixed over the outer end of said hub and adapted with said flange and said closure member to form a lubricant chamber, a plurality of circumferential depressions formed in said hub at its outer end adjacent said flange and communicating with said lubricant chamber, and means for sealing the inner end of the hub against the escape of lubricant.

5. A wheel hub and bearing assembly comprising a sleeve having a circumferential flange, a wheel hub journaled over said sleeve, a portion of said hub bearing against said flange, means for fixing said sleeve to an axle, means closing the outer end of said sleeve, a plate fixed over the outer end of said hub and enclosing the outer closed end of the sleeve to form a lubricant chamber between such closed end and said plate, and passageways in the outer end of the hub communicating with said chamber and with the bearing surfaces of said hub and said sleeve, whereby longitudinal movement of the hub relative to the sleeve will compress the lubricant in the chamber and force such lubricant through the passageways to the bearing surfaces of the sleeve and hub.

6. A wheel hub and bearing assembly comprising a normally non-rotatable sleeve, means for securing said sleeve to an axle, a wheel hub rotatably supported on said sleeve, means for retaining said hub on said sleeve but allowing a limited amount of relative axial movement during operation, a lubricant chamber, means actuated by said axial movement during operation for urging lubricant from said chamber in between said sleeve and said hub, and means for preventing such lubricant from being introduced between said sleeve and said axle.

7. A wheel hub and bearing assembly comprising a sleeve having a closed end provided with a flange extending outwardly therefrom, said sleeve being adapted to receive an axle member and the closed end of the sleeve closing off communication between the axle member and the space externally of said sleeve, a wheel hub surrounding said sleeve and having a bore within which said sleeve bears to transmit the axle load from said sleeve to said hub, said sleeve extending through the wheel hub and fixed to said axle member, and said wheel hub having a portion bearing against one side of the flange on said sleeve, and means carried by said wheel hub and bearing against the other side of said flange to hold said hub on said sleeve.

THEOPHILUS BROWN.
LINWOOD A. MURRAY.